FIG. I.

INVENTORS
JACK A. WHEELER
WALKER H. MATTHEWS

Feb. 17, 1953   J. A. WHEELER ET AL   2,628,612
CILIOMETER

Filed Oct. 25, 1951   3 Sheets-Sheet 2

INVENTORS
JACK A. WHEELER
WALKER H. MATTHEWS

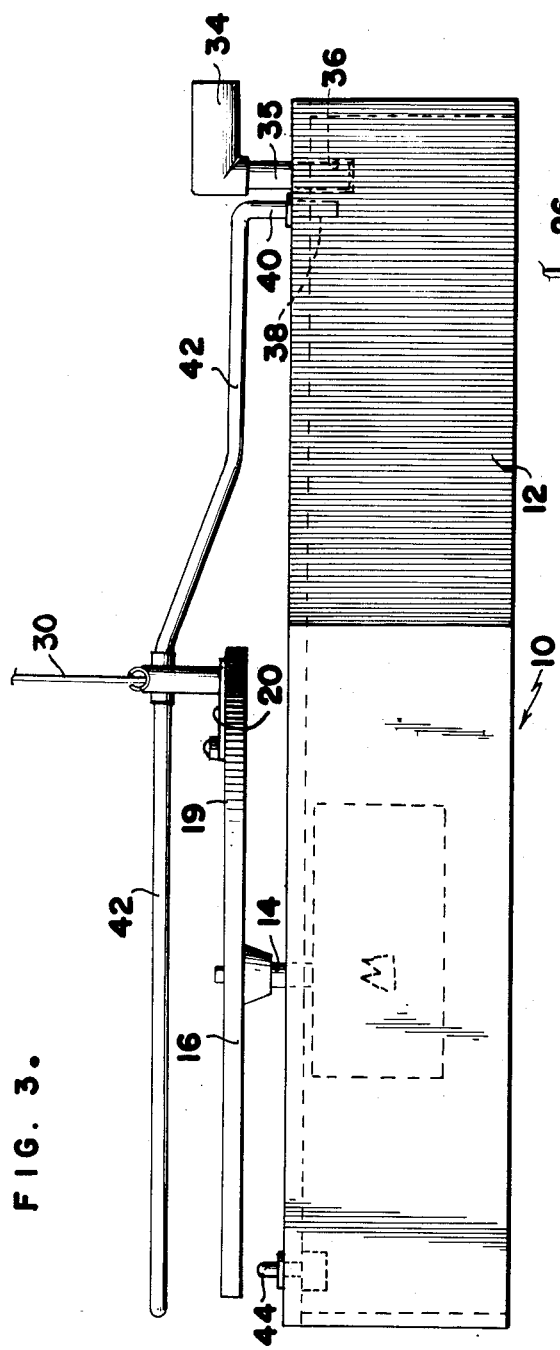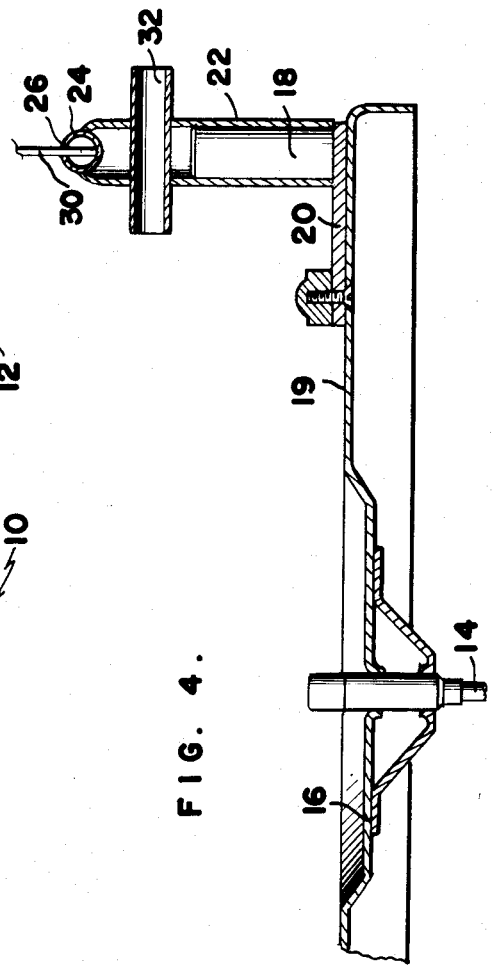

Patented Feb. 17, 1953

2,628,612

UNITED STATES PATENT OFFICE 2,628,612

CILIOMETER

Jack A. Wheeler, Elberton, and Walker H. Matthews, Athens, Ga.

Application October 25, 1951, Serial No. 253,148

5 Claims. (Cl. 128—76.5)

This invention relates generally to ophthalmic devices and more particularly to an improved eye testing and training apparatus.

Various devices of this general type are known in the art and, as a rule, are usually characterized by certain inherent disadvantages. Among these are an unnecessarily high first cost and maintenance, a complexity of structure and operation rendering them difficult of use, a lack of flexibility in design resulting in the need for additional equipment to handle both the testing and treatment phases of optometry, and a bulkiness and immobility resulting in a strain on normal office space facilities.

Accordingly, the chief object of the present invention is to provide an improved ciliometer which will obviate the above-mentioned disadvantages.

Another important object of the present invention is to provide an improved portable ciliometer which, although simple in structure may be used as eye-testing apparatus and to train the eyes monocularly or binocularly as a supplemental instrument in orthoptic training.

A further important object is to provide an improved ciliometer which will stimulate and inhibit the ciliary and the extrinsic muscles in a more effective manner.

A still further important object is to provide an improved ciliometer which may be effectively used in stereopsis, suppression and amblyopic training as well as in suspension, squint or strabismic, fusion, and myopia cases.

Another object is to provide an improved ciliometer which ensures continuous and smooth oscillation of the eye target during eye training, is low in cost, and will be rugged and of long life in use.

Other objects and advantages of the invention will become apparent during the course of the following description.

In its broadest aspects, the invention comprises an apparatus for smoothly and continuous oscillating an eye target maintained in a vertical plane and normal to the eyes to act as a basis for accommodative or focusing stimulation and inhibition.

In the drawings we have shown one embodiment of the invention. In this showing:

Figure 3 is a side elevational view thereof; and

Figure 4 is a fragmentary enlarged view of the eye target supporting post and its mounting.

Figure 1:
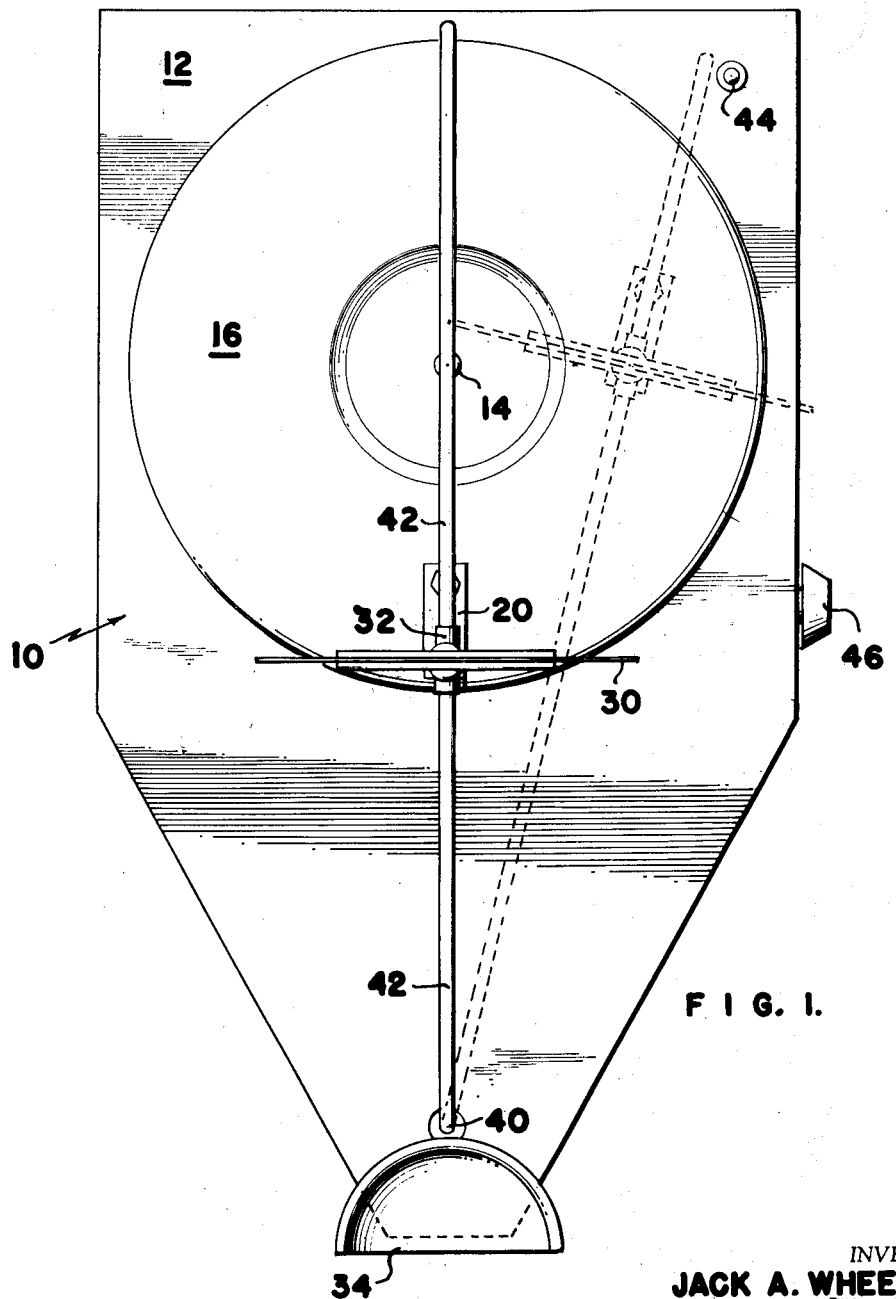
Figure 1 is a top plan view of the apparatus comprising the present invention.
Figure 2:
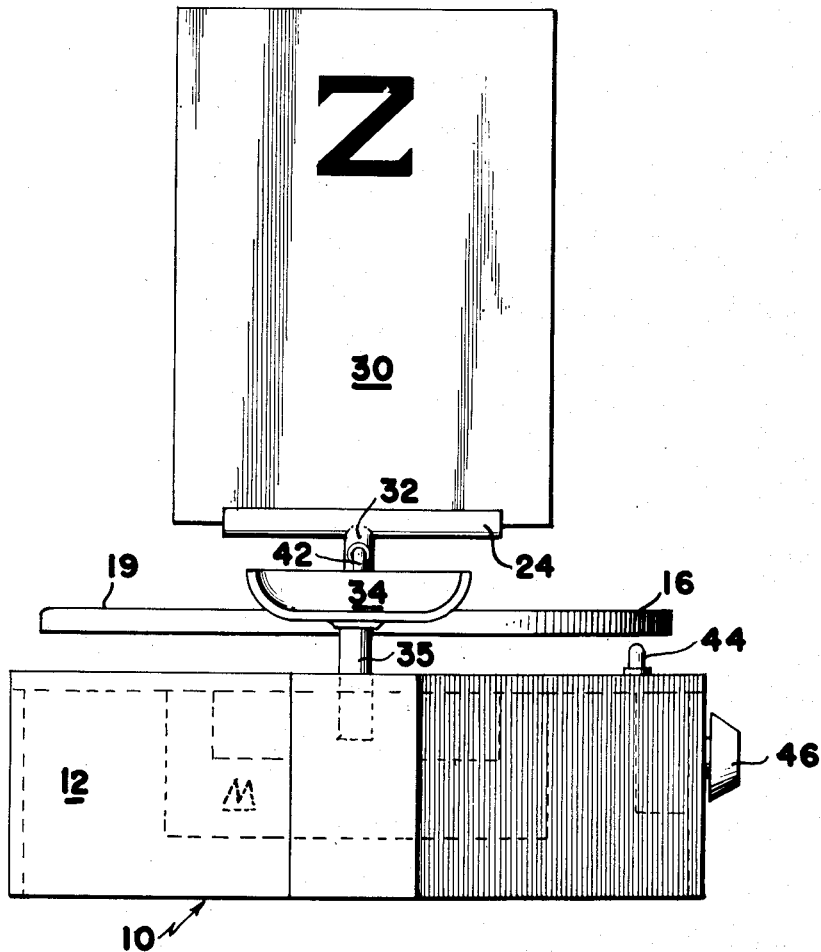
Figure 2 is a front elevational view thereof.

Referring to the drawings, numeral 10 designates the apparatus as a whole which comprises a generally rectangular casing 12 of wood or light metal which houses a motor M from which a drive spindle 14 projects upwardly to support a turn table 16 in the conventional manner. The motor M receives electrical energy from a wall outlet by means of the usual cord and plug (not shown).

An upstanding pin 18 is adjustably mounted on the flat annular surface 19 of the turntable by means of a plate 20 suitably secured thereto as by a nut and bolt. A tubular post 22 is supported for rotation around and by the pin 18 and plate 20, respectively, and at its upper end, the post is provided with a horizontal, transversely extending tube 24 which is longitudinally slotted along its upper periphery as at 26 so as to receive and vertically support an eye target 30 such as a printed card, etc. A second tube 32 extends through and is fixed to the post 22 intermediate its ends just above the pin 18 and at right angles to the target supporting tube 24 for a purpose which will become apparent.

The front end of the casing 12 is tapered and acts as a support for chin rest 34 of ebony or other suitable material which is removably mounted in a socket 36 therein by means of a post 35. A second socket 38 is positioned directly rearward of the chin rest and pivotally supports the down turned end 40 of a target aligning arm 42 which extends rearwardly, inclines upwardly and then extends horizontally through the tube 32 which supports its other end. It will be readily apparent that the point of support varies from a position adjacent the rear end of the arm 42 to a position (Figure 3) approximately midway of its length.

Rotation of the turntable 16 is controlled by an off and on switch 44 and a combination switch and rheostat 46 so that the turntable speed can be controlled as desired from 0 R. P. M. to the normal turntable operating speed of 72 R. P. M.

It is believed to be obvious that rotation of the turntable will cause the target supporting post 22 to travel in a circular path about the axis of spindle 14. Rotation of the target 30 with respect to the pin 18 is controlled by the aligning arm 42 which slides back and forth in the tube 32 and thus always maintains the target normal or at right angles (as shown in dotted lines in Fig. 1) to the socket 36 and hence to the eyes of a patient whose chin rests upon the support 34.

In other words, the pin 18 is fixed with respect to the turntable, by plate 20, and as the turntable rotates, the pin 18 rotates within the sleeve 22, which is maintained normal to the socket 36, by the arm 42. Furthermore, by mounting the pin 18 and its supporting plate 20 on the turntable 19, by means of an adjustable nut and screw as shown in Fig. 4, the location of the pivot point or pin 18 can be varied with respect to the axis of the turntable, to in turn vary the diameter of the circular path of the target supporting element 22. The target will thus, upon energization of the motor M at the desired speed, oscillate from side to side, moving closer and then further away, very smoothly and continuously to effectively exercise a patient's eyes which follow the vertically positioned target in its movements.

The constant and smooth motion of the reading card reflexly stimulates and inhibits the extrinsic eye muscles that govern the placement of the eyes. It also stimulates the ciliary muscles as the reading card forming the target moves toward the patient's eyes and inhibits the ciliary muscles as it moves away.

The accommodative ability of the ciliometer can be further stimulated by placing lenses and prisms in a trial frame before the patient's eyes— after the patient's correct lens prescription is in place. The accommodative ability is inhibited through lenses and prisms used in a like manner.

It will be further apparent to those skilled in the art that the present invention is also of great value in training poor fusion cases through the use of Polaroid vectograms instead of a reading card, and Polaroid glasses before the patient. The necessary prism power placed in the desired position in a trial frame in poor fusion cases can also improve binocular fixation.

In addition to the foregoing, the present apparatus enables suppression and amblyopic training to be given by emphasizing the stimulation of the affected eye. Suspension and squint or strasbismic cases can be trained provided the vision is adequate in the affected eye to create a demand on a large print.

Stereopsis or depth perception training can be given with the same Polaroid vectograms and Polaroid glasses. The rotation of the slide stimulates the desire for this as the training becomes more difficult. Myopia or near-sightedness can be helped by the addition of lenses and prisms and therefore emphasizing the inhibiting phase of training.

It will be appreciated that the extent of oscillation of the eye target in the treatment of the various cases mentioned, may be readily varied by loosening the nut and bolt and adjusting the position of the pin 18 on the annular turn table surface. Thus, as shown, the eye target may have a maximum oscillation as shown in the drawings or the pin 18 may be swung to the inner portion of the annular turn table surface to give the eye target a minimum extent of oscillation.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. A ciliometer comprising a base, a turn table rotatably mounted on said base, means for rotating said turntable, a target supporting element pivotally and eccentrically mounted on said turn table, an arm pivotally mounted at one end on said base and a sliding connection between said arm and said target supporting element, adapted to maintain the supported target in a position normal to a point adjacent the pivot of said arm, during rotation of said turn table.

2. A ciliometer comprising a casing, a turn table rotatably mounted on said casing, a motor in said casing for rotating said turntable, a target supporting element pivotally and eccentrically mounted on said turn table, an arm pivotally mounted at one end on said casing, a sliding connection between said arm and said target supporting element, adapted to maintain the supported target in a position normal to a point adjacent the pivot of said arm, during rotation of said turn table, and means for adjusting the location of the pivot point of said target supporting element, with respect to the axis of said turn table to vary the diameter of the circular path of said target supporting element.

3. A ciliometer as claimed in claim 1 wherein the means for mounting said target supporting element comprises a vertical pin relatively fixed with respect to said turntable, a vertical sleeve member rotatably engaging said pin, means on said sleeve for supporting a target and a horizontal sleeve slidably embracing said arm.

4. A ciliometer as claimed in claim 2, wherein the means for mounting said target supporting element comprises a vertical pin relatively fixed with respect to said turntable, a vertical sleeve member rotatably engaging said pin, means on said sleeve for supporting a target and a horizontal sleeve slidably embracing said arm.

5. A ciliometer as claimed in claim 4 wherein the means for adjusting the pivot point of said target supporting element, comprises a plate eccentrically adjustable on said turntable and supporting said vertical pin.

JACK A. WHEELER.
WALKER H. MATTHEWS.

REFERENCES CITED

The following references are of record in the file of this patent:

UNITED STATES PATENTS

| Number | Name | Date |
|---|---|---|
| 1,738,708 | Howard | Dec. 10, 1929 |
| 2,246,687 | Katz | June 24, 1941 |
| 2,388,493 | Nelson | Nov. 6, 1945 |